Dec. 28, 1943.  W. GSCHING  2,337,748
MEANS FOR THE CONTROL OF COMBINED MECHANICAL AND HYDRAULIC GEARING
Filed Dec. 27, 1938  3 Sheets-Sheet 1

Inventor
WILHELM GSCHING,
Attorneys

Dec. 28, 1943.     W. GSCHING     2,337,748
MEANS FOR THE CONTROL OF COMBINED MECHANICAL AND HYDRAULIC GEARING
Filed Dec. 27, 1938     3 Sheets-Sheet 2

INVENTOR
WILHELM GSCHING
BY Toulmin & Toulmin
ATTORNEYS

Patented Dec. 28, 1943

2,337,748

UNITED STATES PATENT OFFICE 2,337,748

MEANS FOR THE CONTROL OF COMBINED MECHANICAL AND HYDRAULIC GEARING

Wilhelm Gsching, Heidenheim-on-the-Brenz, Germany, assignor to American Voith Contact Company Inc., New York, N. Y.

Application December 27, 1938, Serial No. 247,923
In Germany December 27, 1937

13 Claims. (Cl. 74—189.5)

This invention relates to control devices for variable speed transmissions, and more particularly to fluid operated controlling devices, including a hydraulic torque converter, in which provision is made to cause a speed shifting operation from direct drive to indirect drive and vice versa.

One object of this invention is to provide a method of controlling fluid operated controlling devices of the above type so as to effect control of a plurality of shifting operations in a multispeed transmission gear.

Another object is to provide a method as described above which also enables automatic control of a clutch arranged between the torque converter and the multispeed transmission gear.

It is another object of this invention to provide a fluid operated controlling device including a hydraulic torque converter, in which the torque of the guide wheel enables control of a plurality of shifting operations in a multispeed transmission gear.

A further object of the invention consists in the provision of a device referred to in the preceding paragraph and including engageable and disengageable clutching members between the torque converter and the multispeed transmission gear, which causes automatic disengagement of said clutch members prior to the speed shifting operation and automatic re-engagement of said clutch members at the end of the speed shifting operation.

Still another object of the invention consists in providing a control device of the above type in which the shifting operation of the various speeds is effected at predetermined torques of the guide wheel irrespective of variations in the speed of the driving shaft.

Other objects and advantages of the invention will become more apparent from the following description in connection with the accompanying drawings, in which:

Figure 1 diagrammatically illustrates an embodiment of the invention;

Figure 5:
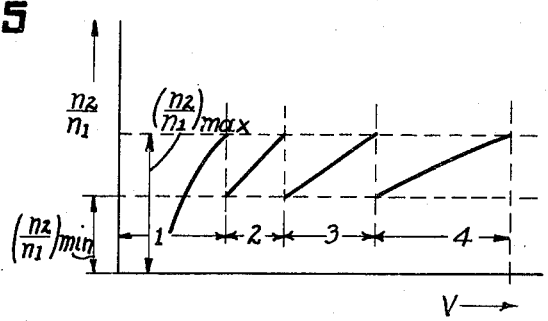
Figure 6:
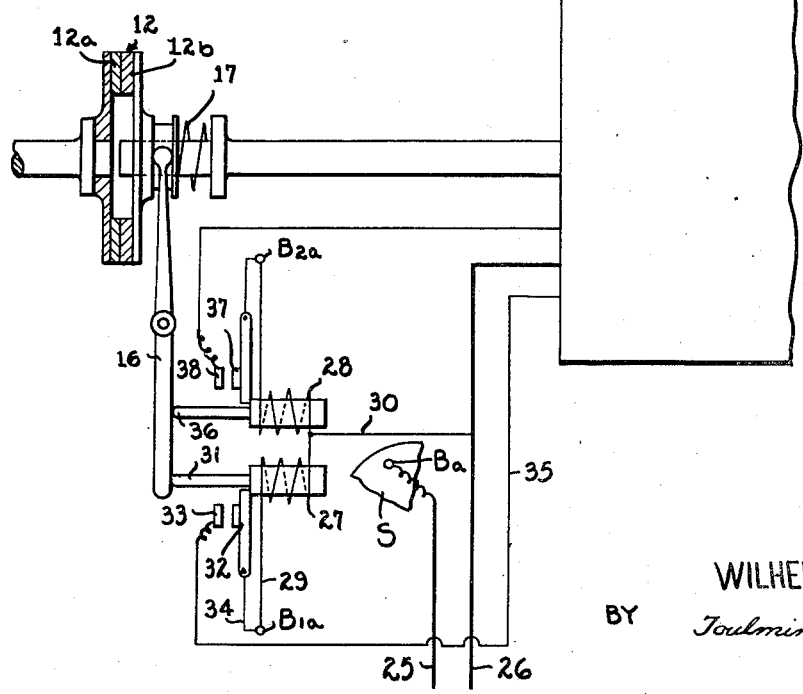
Figure 6:
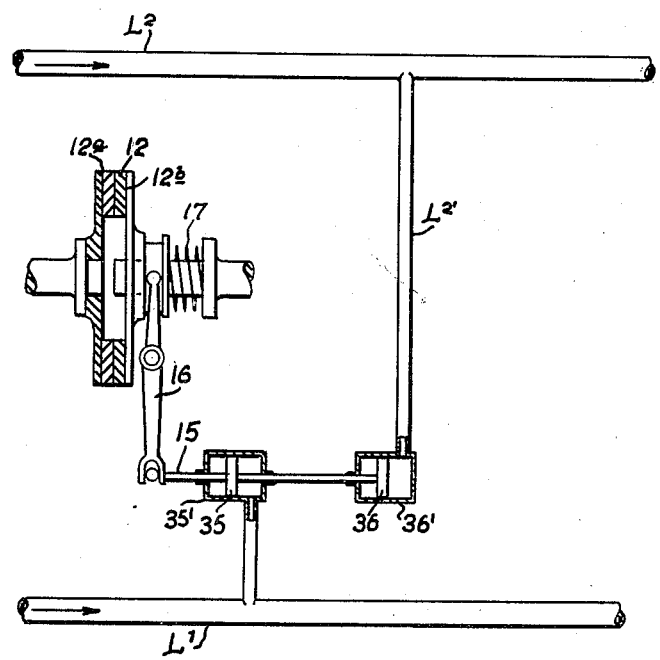
Figure 7:
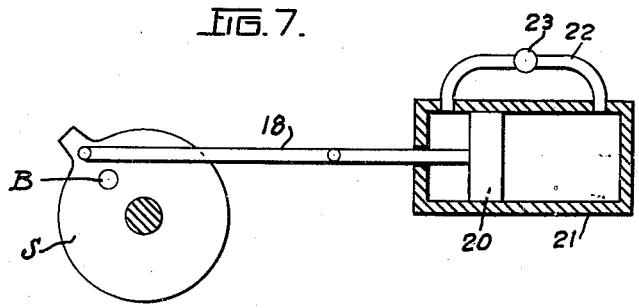

of the driven shaft to the driving shaft;

Figure 5 is a further graph showing the variation of the ratio of $$\frac{n_2}{n_1}$$

with respect to the variation of the driving speed V;

Figures 6, 7 and 8 illustrate further details which may be used in connection with the present invention.

*General arrangement*

Torque converters, following the hydraulic principle, operate in such a manner that, provided the input torque remains substantially constant, the output torque varies with the load. In other words, if the speed of the motor driving the torque converter remains substantially constant, the torque imparted by the torque converter upon the driven shaft varies in accordance with the load. When the difference in the rotating speed of the driving shaft and the driven shaft is greatest, i. e. during starting operation, the torque imparted upon the driven shaft may be a multiple of the torque imparted upon the torque converter. When the driving speed increases, the torque imparted upon the driven shaft decreases and finally drops below that imparted upon the torque converter.

The torque difference between the output and the input torque reacts upon the guide wheel which may be rigidly connected with the speed gear. Consequently, assuming that the speed of the driving engine is kept constant, the guide wheel torque will be dependent on the speed ratio $$\frac{n_2}{n_1}$$

or, in other words, a definite positive or negative guide wheel torque corresponds to each value of $$\frac{n_2}{n_1}$$

Thus, it is immaterial whether the motor is operated at its full speed or at a reduced speed provided the motor speed remains constant. However, the lower the motor speed, the less will be the value of the guide wheel torque which corresponds to each value of $$\frac{n_2}{n_1}$$

This feature of the torque converter, viz. that a definite value of the guide wheel torque corresponds to each value of $$\frac{n_2}{n_1}$$

when $n_1$ is kept constant, is made use of in the present invention for effecting automatic speed changing of a multiple speed transmission gear.

According to the invention, the shifting of the various speeds is made dependent on predetermined values of the guide wheel torque. To this end, the guide wheel is so arranged that it may move through a certain angle in one or the other direction of rotation when the torque imparted upon the guide wheel exceeds or drops below a predetermined maximum or minimum value due to an increase or decrease in the load respectively.

The value of the guide wheel torque at which the guide wheel will move in one or the other direction may be determined in a very simple manner by pressure or tension springs arranged with pre-load at both sides of a protruding portion or member on the guide wheel shaft. The rockable guide wheel transmits its angular deflection or movement, for instance by means of a connecting link, in a mechanical hydraulical or electrical way, to the shifting mechanism for the transmission gear. According to a particularly simple embodiment of the invention, the automatic shifting operation of the transmission gear is effected by hydraulic means. In this instance the rockable guide wheel or a part connected therewith forms a controlling member controlling the supply of fluid to the speed shifting mechanism.

As long as the driving speed, or in other words the load, remains within predetermined limits, the guide wheel is held by spring means intermediate two predetermined positions. When the load exceeds a predetermined maximum value or a decrease in the driving speed occurs (decrease of $$\frac{n_2}{n_1}$$

an increase in the guide wheel torque will result. This torque finally overcomes the opposing force of the spring means so that the guide wheel moves angularly in this "positive" direction. After the guide wheel has moved through a predetermined angle, it causes by mechanical, hydraulical or electrical means operation of a shifting mechanism for changing from a higher speed to the next lower speed. The guide wheel then returns to its intermediate position until, due to a further decrease in the driving speed, the guide wheel torque again overcomes the force of the spring means so as to cause a shifting operation to the next lower speed. With a further decrease in the driving speed, the above-mentioned operation is repeated until the lowest speed has been engaged ("shifting down").

The shifting from a lower speed to a higher speed ("shifting up") is effected in a similar manner. When the load decreases, or in other words the ratio $$\frac{n_2}{n_1}$$

increases, and the guide wheel torque eventually reaches a predetermined absolute minimum value (positive or negative), the guide wheel moves angularly in the opposite direction (negative) against the influence of the spring means until it has reached a predetermined position where it causes a shifting from a lower speed to the next higher speed. The guide wheel then returns to its intermediate position where it remains until, due to an increase or decrease of the driving speed, a shifting up or shifting down operation becomes necessary.

The invention also includes a mechanism adapted concomitantly with the angular movement of the guide wheel to disengage a clutch, arranged between the torque converter and the transmission gear and preferably housed by the transmission gear, while the clutch is automatically re-engaged after the shifting operation of the corresponding speed gear has been effected.

Since due to a disengagement of the clutch, the output torque $M_2$ of the torque converter drops to zero, the guide wheel torque likewise drops to zero and then becomes negative, so that the guide wheel tends to move from its positive position beyond zero position into the negative direction. To prevent the guide wheel during the shifting down operation from reaching its negative maximum value, the return movement of the guide wheel from its predetermined positive maximum value to zero position is preferably retarded so that the speed shifting operation is finished when the guide wheel has reached its zero position. If the speed shifting operation has been caused by a predetermined negative maximum guide wheel torque (shifting up), the declutching operation increases the negative guide wheel torque so that the guide wheel will tend to move further in the negative direction beyond the predetermined negative controlling position. To limit the movement of the guide wheel in the negative direction, an abutment may be provided.

Construction

Figure 1:
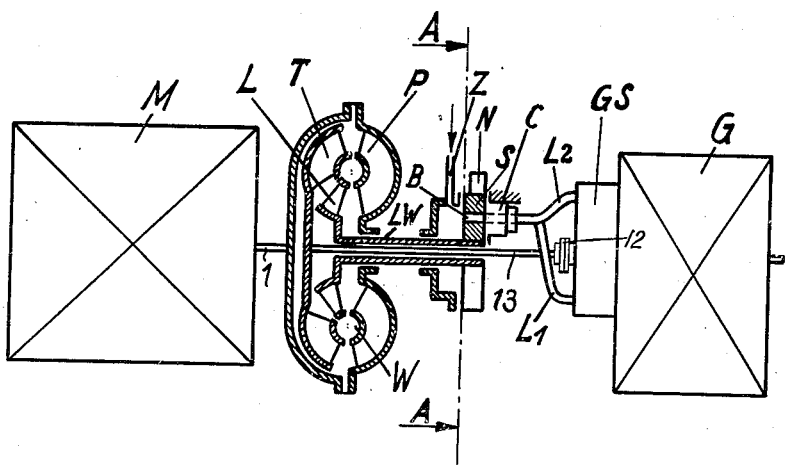

Referring now to the drawings in particular Figure 1 illustrates a hydromechanic compound gear which is provided with a mechanism adapted through the intervention of hydraulic means to effect speed shifting operations in accordance with the value of the guide wheel torque. The hydraulic converter W comprises a pump wheel P drivingly connected with a motor M, a turbine wheel T and a guide wheel L. The shaft 13 drivingly connected with the turbine wheel T is connected with the transmission gear G by means of a clutch 12. The guide wheel L is supported by and rigidly connected with a hollow shaft LW, the outer end of which carries rotatably connected therewith a disc S. The disc S is provided with a tongue N arranged between two yieldable abutments F and F' which normally held the guide wheel in the intermediate position indicated in Figure 2.

Figure 2:
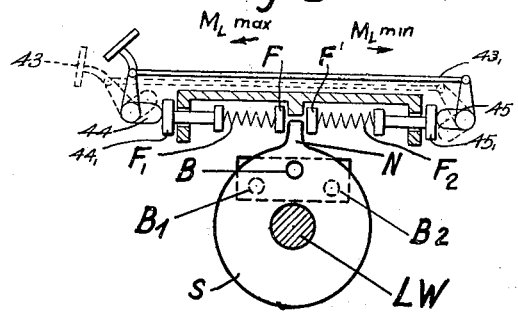
Figure 2 shows a detail of the embodiment of Figure 1.

As soon as the guide wheel torque exceeds a predetermined value $M_L$ max., the spring $F_1$ of the abutment F is compressed and the guide wheel L is moved through a certain angle towards the left, positive (Figure 2), assuming that $M_L$ max. acts in the direction indicated by an arrow in Figure 2. This angular movement of the guide wheel may, for instance, close a hydraulic or an electric circuit which in its turn is adapted to cause shifting of the transmission gear to the next lowest speed.

If a hydraulic operation of the gear shifting mechanism is desired, the invention may be carried out in the manner illustrated in Figures 1 and 2. According to the said figures, the disc S drivingly connected with guide wheel shaft LW is provided with a bore B through which pressure oil, introduced at Z, may pass when bore B registers with one of the two apertures $B_1$ and $B_2$ in the fixed casing C.

As will be seen from Figure 2, bore B of disc S will be in a position intermediate the two bores $B_1$ and $B_2$ as long as the guide wheel occupies its intermediate position. When the guide wheel is moved toward the left, in other words when the guide wheel torque exceeds a predetermined maximum value $M_L$ max., bore B will register with bore $B_1$ so that the pressure oil introduced at Z may pass through conduit $L_1$ into the speed shifting controlling device GS, thereby causing first, disengagement of the clutch 12 between the torque converter and the transmission gear, thereafter shifting down to the next lower speed and finally, re-engagement of the clutch. Similarly, if the load decreases and the guide wheel torque drops below a predetermined negative value $M_L$, the guide wheel moves into the other direction (negative) so that bore B registers with bore $B_2$. Pressure oil may now reach the speed shifting controlling device GS through a second conduit $L_2$ thereby causing a shifting up to the next higher speed. The disengagement of the clutch 12 prior to the actual speed shifting operation and the re-engagement of the clutch at the end of the speed shifting operation may be carried out in any desired manner, e. g., as illustrated in Figure 6.

According to Figure 6, a conduit $L_1^1$ branches off from the conduit $L_1$ and leads to a control cylinder 35' which is filled with oil. Reciprocably mounted in the control cylinder 35' is a control piston 35 interconnected with a control piston 36 reciprocably mounted in a control cylinder 36', likewise filled with oil. The control cylinder 36' is connected by means of a conduit $L_2^1$ with the conduit $L_2$. The piston 35 is furthermore connected by means of a rod 15 with a lever 16 adapted to effect engagement and disengagement of the clutch members $12a$ and $12b$. The operation of the device is as follows:

When the disc S has been shifted so that the bore B admits fluid into the conduit $L_1$, oil also flows into the right end of the control cylinder 35', thereby moving the piston 35 toward the left and causing the lever 16 to disengage the clutch member $12b$ from the clutch member $12a$. When the disc S, after the completion of the speed shifting operation, returns to its intermediate position in which the bore B does not establish a fluid connection between the conduit Z and the conduit $L_1$, the spring 17 brings the clutch member $12b$ again into engagement with the clutch member $12a$, thereby returning the piston 35 to its previous position.

If, on the other hand, the disc S establishes a fluid connection between the conduit Z and the conduit $L_2$, oil passes from the conduit $L_2$ through conduit $L_2^1$ into the right end of the cylinder 36', thereby shifting the piston 36 toward the left which in its turn, by means of rod 15, shifts the lever 16 so as to disengage the clutch member $12b$ from the clutch member $12a$ in the same manner as described above. Similarly, after the completion of the speed shifting operation and the interruption of the fluid connection between the conduit Z and the conduit $L_2$, the spring 17 returns the clutch member $12b$ into engagement with the clutch member $12a$, thereby also causing the return of the piston 36 to its previous position.

Instead of using a disc S as a controlling valve, the disc S may, as previously indicated, be connected with a connecting link which in its turn may operate a controlling valve.

If an electrically shiftable speed gear is provided, the closure of the shifting circuit may be effected in response to the movement of the guide wheel L, for instance, by an arrangement shown in Figure 8. In this instance, the bores B, $B_1$ and $B_2$ are replaced by corresponding contacts $B_a$, $B_{1a}$ and $B_{2a}$ respectively, of which the contact $B_a$ carried by the disc S is connected with the main supply line 25, whereas the main supply line 26 leads to the gear box $G_a$ of a standard electrically shiftable speed gear. Furthermore, the lever 16 of the clutch 12 is shifted in one direction by electric solenoids 27 and 28 in the following manner:

When the disc S has been shifted so that the contact $B_a$ thereon engages the contact $B_{1a}$, current flows from the main supply line 25 through contacts $B_a$ and $B_{1a}$ through line 29 to the solenoid 27 and from there through line 30 to the main supply line 26. As a result thereof, solenoid 27 is energized and shifts the armature 31 toward the left, thereby swinging the lever 16 of the clutch 12 in clockwise direction to disengage the clutch members $12a$ and $12b$ in the manner described in connection with Figure 6. During the leftward movement of the armature 31, the latter engages the contact 32 and moves the same toward the contact 33 which is engaged at the end of the leftward movement of the armature 31. In this way, a new circuit is established, which comprises main supply line 25, contact $B_a$, contact $B_{1a}$, line 34, contacts 32 and 33 and line 35, which leads to the electrically shiftable gear in the gear box $G_a$, and from here the current returns to the main supply line 26. The gear is then electrically shifted in a standard manner.

When the disc S, after the completion of the speed shifting operation, returns to its intermediate position in which the contact $B_a$ does not engage the contact $B_{1a}$, the spring 17 brings the clutch members $12a$ and $12b$ again into engagement with each other, thereby also returning the armature 31 to its initial position, which latter operation is possible since, at this time, the energizing circut for the solenoid 27 is broken due to the disengagement of the contact $B_a$ from the contact $B_{1a}$.

Similarly, when the disc S moves in the opposite direction so as to bring the contact $B_a$ into engagement with the contact $B_{2a}$, the solenoid 28 will be energized which, in its turn, causes the armature 36 to shift the lever 16 in clockwise direction for opening the clutch 12, while bringing the contacts 37 and 38 into engagement with each other for establishing the circuit to correspondingly shift the gears in the gear box $G_a$.

As previously mentioned, if the speed shifting operation has been caused by a predetermined negative maximum guide wheel torque, the declutching operation increases the negative guide wheel torque so that the guide wheel will tend to move further in the negative direction beyond the predetermined negative controlling position. To prevent this movement of the guide wheel beyond the predetermined negative controlling position, the arrangement of Figure 7 may be provided.

According to Figure 7, the disc S has pivotally connected therewith a rod 18 which in its turn is connected with a piston 20 reciprocably mounted in a cylinder or dash pot 21 filled with oil. The spaces on each side of the piston 12 are interconnected by a conduit 22 with an adjustable choke valve 23. The choke valve 23 is so adjusted that the dash pot piston arrangement 21, 20 has no retarding effect. However, at the moment when the clutch member 12b is declutched from the clutch member 12a and, thereby, the guide wheel torque suddenly drops to zero, i. e., the guide wheel tends to go beyond the predetermined negative controlling position, the piston cylinder arrangement 20, 21 becomes operative as to its retarding effect. The springs $F_2$ furthermore constitute an abutment definitely arresting the disc S when during its shifting movement in negative direction it reaches a predetermined point.

*Performance characteristics*

Figure 4:
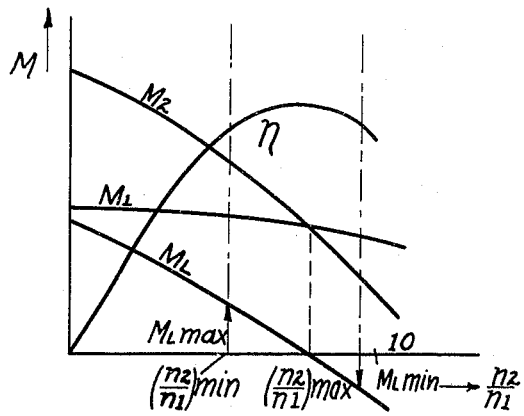
Figure 4 is a graph illustrating the interdependence of the torque of a hydraulic converter and the speed ratio $$\frac{n_2}{n_1}$$

Figure 4 shows the performance characteristics of a typical form of the invention, such as shown diagrammatically in Figures 1 and 2. In Figure 4, the abscissae represent the varying values of the speed ratio $$\frac{n_2}{n_1}$$

whereof $n_2$ is the speed of the driven or output shaft 13 and $n_1$ is the speed of the driving or input shaft 1. The ordinates in Figure 4 represent the values of the various torques; $M_1$ being the torque of the driving or input shaft 1, and $M_2$ the torque of the driven or output shaft 13, while $M_L$ corresponds to the difference between $M_2$ and $M_1$ (i. e. $M_L = M_2 - M_1$) and indicates the torque of the guide wheel L.

As will be seen from Figure 4, the torque converter adapts the output torque $M_2$ to the driving speed. The greater the load, or in other words, the lower the driving speed and the smaller the value of $$\frac{n_2}{n_1}$$

the greater will be the output torque $M_2$. The torque difference $M_L = M_2 - M_1$ varies in accordance with the variation of the ratio $$\frac{n_2}{n_1}$$

so that each value of $M_L$ corresponds to a certain value of $$\frac{n_2}{n_1}$$

In accordance with the respective requirements of the vehicle to be equipped with a hydromechanic compound gear according to the present invention, the entire speed range is subdivided into a plurality of speeds, e. g. four speeds as indicated in Figure 5. With each speed, the torque converter operates within the range defined by the dot-dash lines of Figure 4. Those lines correspond to a definite absolute maximum value and minimum value respectively of the guide wheel torque. The said maximum value indicates the guide wheel torque which shall effect the changing down to the next lower speed, whereas the said minimum value corresponds to the guide wheel torque which will effect changing up to the next higher speed, so that the torque converter always operates within the range of the highest efficiency. The graph indicating the efficiency of the torque converter is marked $n$.

Figure 5 illustrates the speed shifting operation for each speed of a four speed gear. The abscissa represents the varying values of the driving speed V, while the ordinates represent the varying values of the ratio $$\frac{n_2}{n_1}$$

Figure 3:
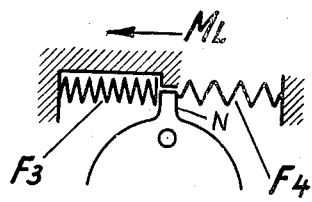
Figure 3 shows an alternative construction of a detail of the invention.

The horizontal dotted lines in Figure 4 define similarly to the dot-dash lines of Figure 3, the maximum and minimum guide wheel torques which determine or cause the shifting up or shifting down operation. As will be clear from Figure 5, the shifting up operation for each speed is effected at one and the same maximum value of $$\frac{n_2}{n_1}$$

whereas the shifting down operation is effected for each speed at one and the same minimum value of $$\frac{n_2}{n_1}$$

Since the minimum value of $$\frac{n_2}{n_1}$$

corresponds to the maximum torque difference $M_L$ max., and the maximum value of $$\frac{n_2}{n_1}$$

corresponds to the minimum torque difference $M_L$ min., it is clear from Figures 4 and 5, that the shifting up is effected at one and the same $M_L$ min. and the shifting down is effected at one and the same $M_L$ max.

As will be obvious from the description of Figures 1, 2, 4 and 5, the exact values, at which the speed shifting, up or down, is to be effected, may be determined by a proper choice of the springs $F_1$ and $F_2$.

If with decreasing load the shifting up is to be effected when the guide wheel torque is zero or above zero, i. e. positive, the spring arrangement of Figure 2 is preferably replaced by an arrangement illustrated in Figure 3. According to Figure 3, the tongue N is arranged between a pressure spring $F_3$ and a tension spring $F_4$, the positive guide wheel torque being assumed to act in the direction indicated by the arrow of Figure 3. The tension spring $F_4$ has one end connected to the tongue N of the disc S while the other end of the tension spring is connected to a fixed point.

The considerations so far apply to a case in which the driving motor operates with a constant rotating speed, say e. g. with its maximum speed. However, to make the automatic speed shifting operation, which is effected in accordance with the guide wheel torque, independent of the rotating speed of the motor, the spring-urged abutments, which tend to hold the tongue N and thereby the guide wheel in the intermediate position, are so arranged that the pressure of the springs may be varied in accordance with the motor speed. To this end, the gas pedal is so connected with the spring-urged abutments that the pressure of the springs is automatically adjusted in accordance with the operation of the gas pedal, i. e. in accordance with the fuel supply and thereby in accordance with the motor speed. Since a decrease in the motor speed results in a decrease of the motor torque $M_1$, also the output torque $M_2$ of the torque converter and consequently the torque difference $M_L = M_2 - M_1$ decreases. Therefore, the spring-urged abutments must be operatively connected with the gas pedal or with means dependent on the motor speed in such a manner that when the gas pedal is moved toward closed position, or in other words, when the motor speed decreases, the spring pressure decreases in correspondence to the decrease in the guide wheel torque. A simple and practical embodiment of this feature is shown in Figure 2 which illustrates how the adjustment of the spring means acting upon the abutments F, F' may be effected in accordance with the position of the gas pedal. To this end the gas pedal 43 is provided with a cam 44 acting upon an abutment 44₁ which in its turn is adapted to compress the spring F₁. Similarly, spring F₂ can be compressed by an abutment 45₁ in cooperation with a cam 45 which in its turn is operatively connected with the pedal 43 by means of a connecting rod 43₁. In the position illustrated in full lines in Figure 2 the springs are compressed, whereas the pressure of the springs is less when the pedal 43 is in the position indicated in dotted lines.

I desire to comprehend within my invention such modifications as may be embraced within my claims and the scope of my invention.

Having thus fully described my invention, what I claim as new and desire to secure by Letters Patent is:

1. In combination, a torque converter including a pump wheel, a turbine wheel and a rockable guide wheel, driving means drivingly connected with said converter, driven means including a multispeed transmission gear, adapted to be drivingly connected with and disconnected from said converter in response to a predetermined movement of said rockable guide wheel, a controlling member connected with said guide wheel, means cooperating with said controlling member and normally preventing said guide wheel from angularly moving in one direction or the other but adapted to allow said guide wheel angularly to move in one direction when a predetermined maximum guide wheel torque has been obtained and to move in the opposite direction at a predetermined minimum guide wheel torque, and means controlled by said angular movement of said guide wheel and adapted to cause a speed change in said transmission gear.

2. In combination, a hydraulic torque converter including a guide wheel movable about its axis between two predetermined positions, driving means for said torque converter, a speed gear adapted to be drivingly connected with or disconnected from said torque converter in response to a predetermined movement of said guide wheel, means normally holding said guide wheel intermediate said two predetermined positions but adapted to yield so as to allow said guide wheel to occupy one or the other of said two predetermined positions when the guide wheel torque exceeds a predetermined maximum value or drops below a predetermined minimum value respectively, and means responsive to the movement of said guide wheel into one or the other of said predetermined positions, for effecting a speed shifting operation in said speed gear.

3. In combination, a torque converter including a pump wheel, a turbine wheel and a rockable guide wheel, driving means drivingly connected with said converter, driven means including a multispeed transmission gear, adapted to be drivingly connected with and disconnected from said torque converter in response to a predetermined movement of said rockable guide wheel, a controlling member connected with said guide wheel and comprising a portion movable from an intermediate position into two opposite directions, yieldable means adapted to engage said portion so as to normally hold said controlling member substantially stationary in said intermediate position but to allow said portion to move in one direction at a predetermined maximum guide wheel torque, and to move in the other direction at a predetermined minimum guide wheel torque, and means controlled by movement of said controlling member and adapted to cause a speed change in said transmission gear.

4. In combination, a torque converter including a pump wheel, a turbine wheel, and a guide wheel angularly movable about its axis, driving means drivingly connected with said pump wheel, driven means, including a hydraulically operable multispeed transmission gear, adapted to be drivingly connected with and disconnected from said turbine wheel in response to a predetermined movement of said guide wheel, a controlling member connected with said guide wheel and having a bore therethrough adapted to communicate with a fluid pressure source, resilient means adapted to engage two opposite portions of said controlling member so as normally to prevent movement of the controlling member in the direction of said resilient means but adapted, when the guide wheel torque exceeds a predetermined maximum value, to allow a limited movement of said controlling member in the direction of one resilient means and, when the guide wheel torque decreases beyond a predetermined minimum value, to allow limited movement in the opposite direction, conduits communicating with the fluid pressure system of said speed gear and adapted to register with the bore in the controlling member at said maximum or minimum guide wheel torque respectively, to cause fluid pressure supply to said transmission gear for effecting a speed change thereof.

5. In combination, driving means, a hydraulic torque converter including a guide wheel movable about its axis between two predetermined positions and adapted to be drivingly connected with said driving means, means normally holding said guide wheel substantially stationary intermediate said two positions but adapted to allow movement of said guide wheel into one or the other of said two positions when the guide wheel torque exceeds a predetermined maximum value or drops below a predetermined minimum value respectively, a multispeed transmission gear including a gear change selector and adapted to be driven by said torque converter, means for interrupting the driving connection between said torque converter and said transmission gear in response to a predetermined movement of said guide wheel, and means operatively connected with said guide wheel and controlling power means for operating said selector when said guide wheel has reached one of said two predetermined positions.

6. In combination, driving means, a hydraulic torque converter including a guide wheel movable about its axis between two predetermined positions and adapted to be drivingly connected with said driving means, yieldable means normally holding said guide wheel intermediate said two positions but adapted to allow movement of said guide wheel against the influence of said yielding means into one or the other of said two positions when the guide wheel torque exceeds a predetermined maximum value or drops below a predetermined minimum value respectively, a multispeed transmission gear adapted to be driven by said torque converter, means for interrupting the driving connection between said torque converter and said transmission gear in response to a predetermined movement of said guide wheel, shifting means for said transmission gear, and means operatively connected with said guide wheel and adapted, when said guide wheel has reached one of said two predetermined positions, to close an electric circuit for actuating said shifting means to cause a speed change in said transmission gear.

7. In combination, a fuel operated motor, controlling means adapted to control supply of fuel to said motor, a hydraulic torque converter adapted to be drivingly connected to said motor and including a turbine wheel and a guide wheel movable about its axis between two predetermined positions, a multispeed gear adapted to be drivingly connected with or disconnected from said turbine wheel in response to a predetermined movement of said guide wheel, resilient means operatively connected with said fuel controlling means so as to cause a change in the power of said resilient means in correspondence to a change in the fuel supply to said motor, said guide wheel normally being held intermediate said two predetermined positions but being adapted to move against the influence of said resilient means into one or the other of said two positions when the guide wheel torque exceeds a predetermined maximum value or drops below a predetermined minimum value respectively, and means controlled by said guide wheel so as to cause a speed change in said multispeed transmission gear when said guide wheel has reached one of said two predetermined positions.

8. In combination, a motor, a hydraulic torque converter adapted to be drivingly connected to said motor and including a guide wheel movable about its axis between two predetermined positions, a multispeed gear adapted to be drivingly connected with said motor, means interposed between said torque converter and said multispeed gear and adapted in response to a predetermined movement of said guide wheel to interrupt the driving connection between said motor and said gear, spring means normally causing said guide wheel to remain substantially stationary intermediate said two predetermined positions but adapted to allow said guide wheel to move against the influence of said spring means into one or the other of said two positions when the guide wheel torque exceeds a predetermined maximum value or drops below a predetermined minimum value respectively, means responsive to the variation of the motor speed for changing the load of said spring means in accordance with the motor speed, and means controlled by said guide wheel so as to cause a speed change in said multispeed gear when said guide wheel has reached one of said two predetermined positions.

9. In combination a torque converter comprising a rotatable pump wheel, a rotatable turbine wheel and a guide wheel angularly movable about its axis, a motor drivingly connected with said pump wheel, driven means including a multispeed transmission gear, clutch members arranged between said motor and said driven means and adapted to establish and disconnect driving connection therebetween, a controlling member operatively connected with said guide wheel, means cooperating with said controlling member and normally preventing said guide wheel from angularly moving in one direction or the other but adapted to allow said guide wheel angularly to move in one direction when the guide wheel torque exceeds a predetermined maximum value, and to move in the opposite direction when the guide wheel torque decreases beyond a predetermined minimum value, and means controlled by said angular movement of said guide wheel and adapted to cause disengagement of said clutch members, a speed change in said transmission gear and re-engagement of said clutch members.

10. In combination, a hydraulic torque converter having a guide wheel rotatable between two predetermined positions, driving means for said torque converter, a change gear comprising a plurality of speeds and adapted to be connected with or disconnected from said converter in response to a predetermined movement of said guide wheel, means normally holding said guide wheel in a position intermediate said two predetermined positions but adapted to allow said guide wheel to occupy one or the other of said two predetermined positions when the guide wheel torque reaches a predetermined maximum or minimum value respectively, and means responsive to the movement of said guide wheel into one or the other of said two predetermined positions to cause a shifting operation from a lower speed to a higher speed (shifting up) when the guide wheel torque reaches said predetermined minimum value, and to cause a shifting operation from a higher to a lower speed (shifting down) when the guide wheel torque reaches said predetermined maximum value, the shifting up and shifting down operations being effected for all speeds at one and the same minimum and at one and the same maximum guide wheel torque respectively.

11. In combination, a hydraulic torque converter including a guide wheel, a controlling member drivingly connected with said guide wheel and rotatable between two predetermined positions, driving means for said torque converter, a speed gear adapted to be drivingly connected with or disconnected from said converter in response to a predetermined movement of said guide wheel, a pressure spring, a tension spring, both springs urging said controlling member into one and the same direction of rotation and being adapted to hold said controlling member intermediate said two predetermined positions as long as the guide wheel torque remains below a predetermined maximum and above a predetermined minimum value, and means responsive to the movement of said guide wheel into one or the other of said two predetermined positions for causing a speed change in said speed gear.

12. In combination, a hydraulic torque converter including a guide wheel rotatable between two predetermined positions, a fuel operated motor for driving said torque converter, controlling means for controlling the supply of fuel to said motor, a speed gear adapted to be drivingly connected with or disconnected from said torque converter in response to a predetermined movement of said guide wheel, spring means normally holding said guide wheel intermediate said two predetermined positions but adapted to yield so as to allow said guide wheel to occupy one or the other of said two predetermined positons when the guide wheel torque exceeds a predetermined maximum value or drops below a predetermined minimum value respectively, means operatively connecting said controlling means with said spring means so as to increase the pressure of said spring means when the controlling means is actuated to increase the supply of fuel, and to decrease the pressure of said spring means when the controlling means is actuated to decrease the supply of fuel, and means responsive to the movement of said guide wheel into one or the other of said predetermined positions, for effecting a speed shifting operation in said speed gear.

13. In combination, a prime mover, a driving shaft connected to said prime mover, a driven shaft, means for connecting said driving and driven shafts including a hydro-kinetic torque converter having an impeller connected to the driving shaft, a turbine member and a reaction member, and a selective change-speed transmission interconnecting said turbine member with the driven shaft, and means responsive to the torque on said reaction member for controlling said selective change-speed transmission.

WILHELM GSCHING.